United States Patent [19]
Rudewick, III

[11] 3,921,659
[45] Nov. 25, 1975

[54] MODULAR BALANCED PRESSURE MIXING VALVE WITH CERAMIC VALVE ELEMENTS
[75] Inventor: Charles J. Rudewick, III, Newark, Del.
[73] Assignee: Speakman Company, Wilmington, Del.
[22] Filed: Dec. 19, 1973
[21] Appl. No.: 426,236

[52] U.S. Cl. ............ 137/98; 137/454.6; 137/625.41
[51] Int. Cl.² ...................... F16K 19/00; G05D 7/00
[58] Field of Search..... 137/625.17, 625.41, 625.66, 137/454.5, 454.6, 98, 100; 251/368

[56] References Cited
UNITED STATES PATENTS

| | | | |
|---|---|---|---|
| 1,527,927 | 2/1925 | Schroder | 137/625.41 X |
| 2,780,412 | 2/1957 | Holley | 137/98 X |
| 2,931,389 | 4/1960 | Moog et al. | 137/625.62 |
| 3,023,784 | 3/1962 | Monson | 137/625.41 X |
| 3,171,441 | 3/1965 | Schonfeld | 137/625.41 X |
| 3,331,396 | 7/1967 | Willis | 251/368 X |
| 3,433,264 | 3/1969 | Parkison | 137/625.17 |
| 3,646,969 | 3/1972 | Stampfli | 137/625.66 X |
| 3,674,048 | 7/1972 | Mandogian et al. | 137/625.41 X |
| 3,688,790 | 9/1972 | Esten | 137/98 |
| 3,706,322 | 12/1972 | Carlson | 137/625.66 |
| 3,724,480 | 4/1973 | Povalski et al. | 137/98 |
| 3,780,758 | 12/1973 | DeVries | 137/454.6 |
| 3,788,601 | 1/1974 | Schmitt | 137/454.6 X |
| 3,799,496 | 3/1974 | Esten | 137/98 X |

*Primary Examiner*—Henry T. Klinksiek
*Attorney, Agent, or Firm*—Connolly & Hutz

[57] ABSTRACT

A balanced pressure mixing valve includes diaphragm actuated means for modulating hot and cold water flow to prevent scalding, and mating ceramic valve elements. The diaphragm and ceramic valve elements comprise a replaceable drop-in cartridge to facilitate installation. This cartridge does not contain any sealing means on the periphery thereof which facilitates installation in the valve body and avoids leakage usually associated with side sealing means which get nicked, torn, distorted or even lost during installation or replacement. The ceramic valve elements are designed for long life and assure full flow of water through the valve.

8 Claims, 9 Drawing Figures

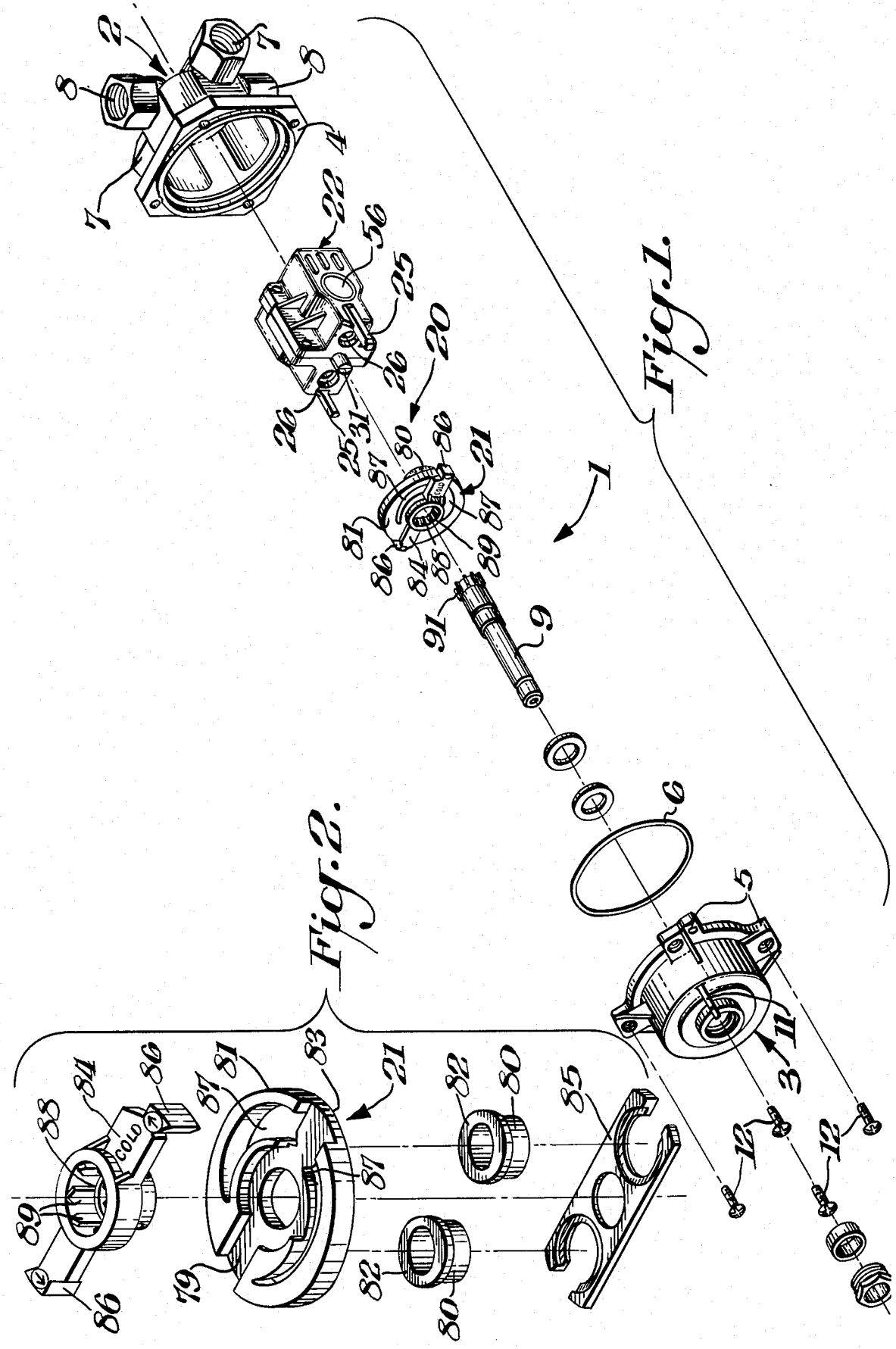

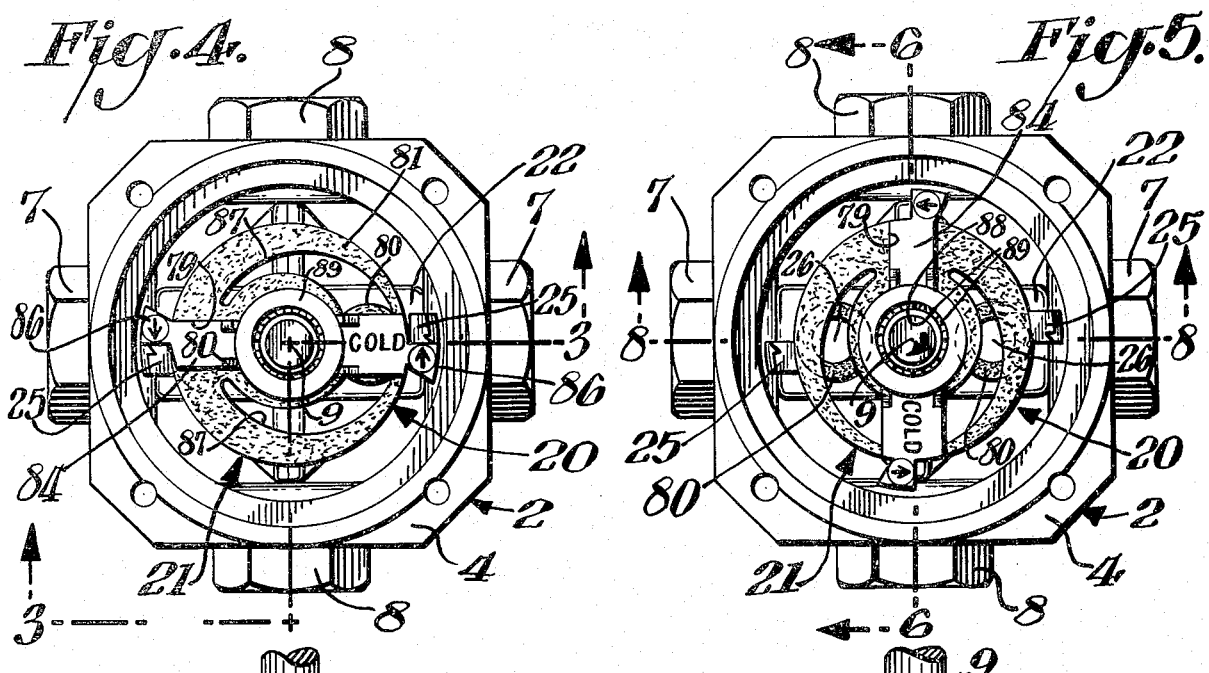
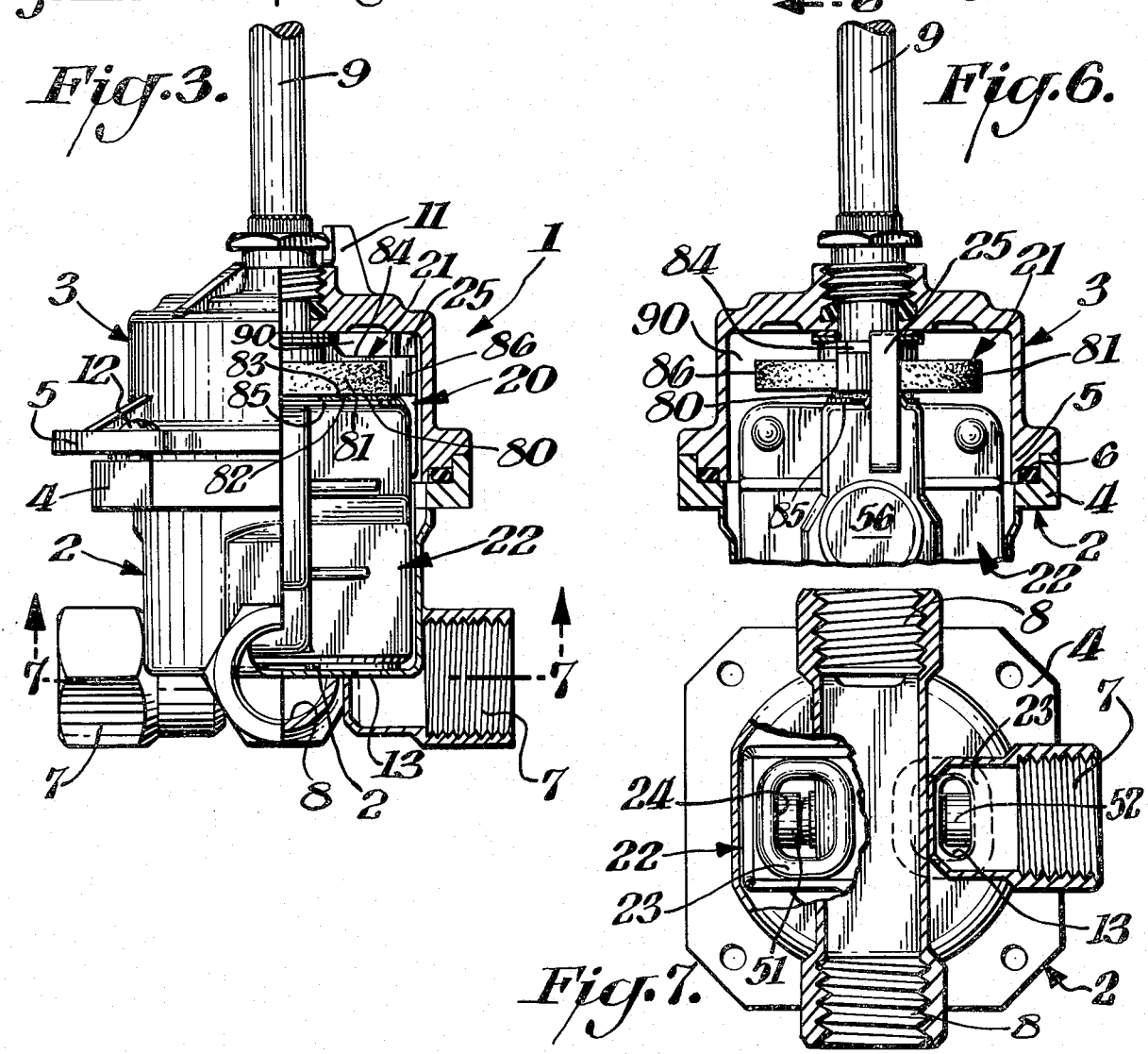

Hot ···→                    ←··· Cold

MODULAR BALANCED PRESSURE MIXING VALVE WITH CERAMIC VALVE ELEMENTS

BACKGROUND OF THE INVENTION

This invention relates to a single handle balanced pressure valve with a more effective balanced pressure feature and longer lasting valve elements than found in prior art devices. These features among others are incorporated in a self-contained cartridge which is designed to fit into a mating valve body in such a way that proper seating of inlet seals between the valve body and the bottom of the cartridge is assured. Seals on the side of the cartridge are eliminated to facilitate placement of the cartridge in the valve body and avoid any damage to seals which frequently occurs when so located.

The balanced pressure feature of this invention prevents scalding which occurs when there is a sudden drop of pressure in a cold water line upstream. A foolproof anti-scald feature is critical in institutional use such as hospitals, schools, etc. and has become a requirement of other institutions like hotels, motels where avoidance of scalding is of paramount importance to customer good will and the avoidance of potential harm to the customer. Similarly if the hot water pressure drops the cold water flow is modulated to prevent undue variations in temperature.

The valving elements used in this device are complementary ceramic parts whose mating surfaces are ground to a smoothness sufficient to maintain sealing contact without necessity of the usual seals such as O-rings, gaskets, washers or the like.

SUMMARY OF THE INVENTION

While the valve of the present invention has been primarily developed for use in shower, bath and other domestic uses and will be illustrated and described hereinafter with particular reference thereto, it is appreciated that the device is capable of other applications all of which are intended to be comprehended herein.

One object of the present invention is to provide a replaceable cartridge-like valve which combines a balanced pressure feature with long lasting ceramic valve elements. The present invention provides a cartridge which is easy to install, inexpensive to make, compact in size, and exceptionally efficient in maintaining a constant water temperature.

It is one specific objective of the invention to provide such a cartridge without seals on the side thereof, thus avoiding dislocation, nicking, breaking or other abuse of such seals which usually occurs when cartridges are inserted in valve bodies in the field.

It is another object of the present invention to provide improved ceramic valve elements whose operation is based on rotation of a ceramic regulating disc having a pair of arcuate openings that register with and mate against ceramic hot and cold water valve seats. This simple rotational movement is capable of fully opening the respectiive valve seats and permits substantially full flow of either hot or cold water while eliminating the cumbersome "joy-stick" operation of prior art ceramic valve devices.

It is also an object of this invention to provide an improved balanced pressure diaphragm and diaphragm retainer in the valve cartridge. These features are specifically designed to avoid distortion in the diaphragm which would result in differing responses to hot versus cold water pressure variations.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 1 is an exploded view of the balanced pressure mixing valve of this invention;

FIG. 2 is an exploded view of the ceramic valve portion of the valve cartridge;

FIG. 3 is a cross sectional view taken along lines 3—3 of FIG. 4;

FIG. 4 is a top plan view of the mixing valve (with bonnet removed) and cartridge with the ceramic valve elements in the closed position;

FIG. 5 is the same view as FIG. 4 with both hot and cold water outlets partially open;

FIG. 6 is a fragmental cross sectional view along lines 6—6 of FIG. 5 showing upper portion of cartridge in elevation;

FIG. 7 is a cross sectional view along lines 7—7 of FIG. 3 showing inlet sealing rings;

DESCRIPTION OF THE PREFERRED EMBODIMENTS

Figure 9:
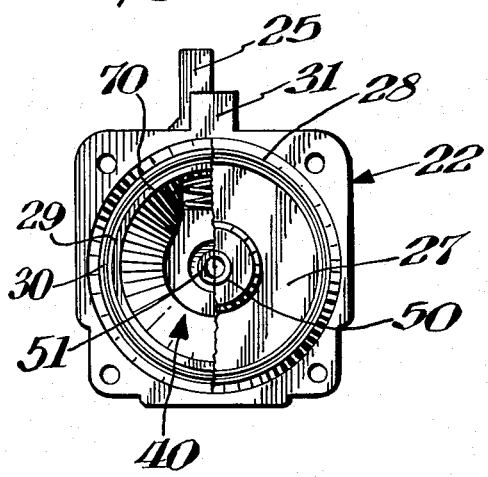
FIG. 9 is a front elevational view of left half of the cartridge with part of diaphragm in place.

The outer portion of the valve 1 shown in FIG. 1 comprises two elements, a bottom valve body 2 and an upper bonnet 3 which are held in sealing engagement one with the other through mating flanges 4, 5 and sealing means 6 such as an O-ring. Connected to the valve body are inlet adapters 7 capable of being attached by pipe threads or sweating to hot and cold water inlet supplies and one or more outlet adapters 8. Protruding from the bonnet 3 and in sealing engagement therewith is the valve stem 9 which can be attached at its outer end to a suitable handle which may contain a color indicator such as shown in U.S. Pat. No. 3,238,968 to inform the user of the desired water temperature. Also attached to the stem is a temperture limit stop which is adjustable at the appropriate rotational angle to abut against a stop 11 on the bonnet 3 when the point of maximum rotation for this particular valving arrangement is reached.

Figure 8:
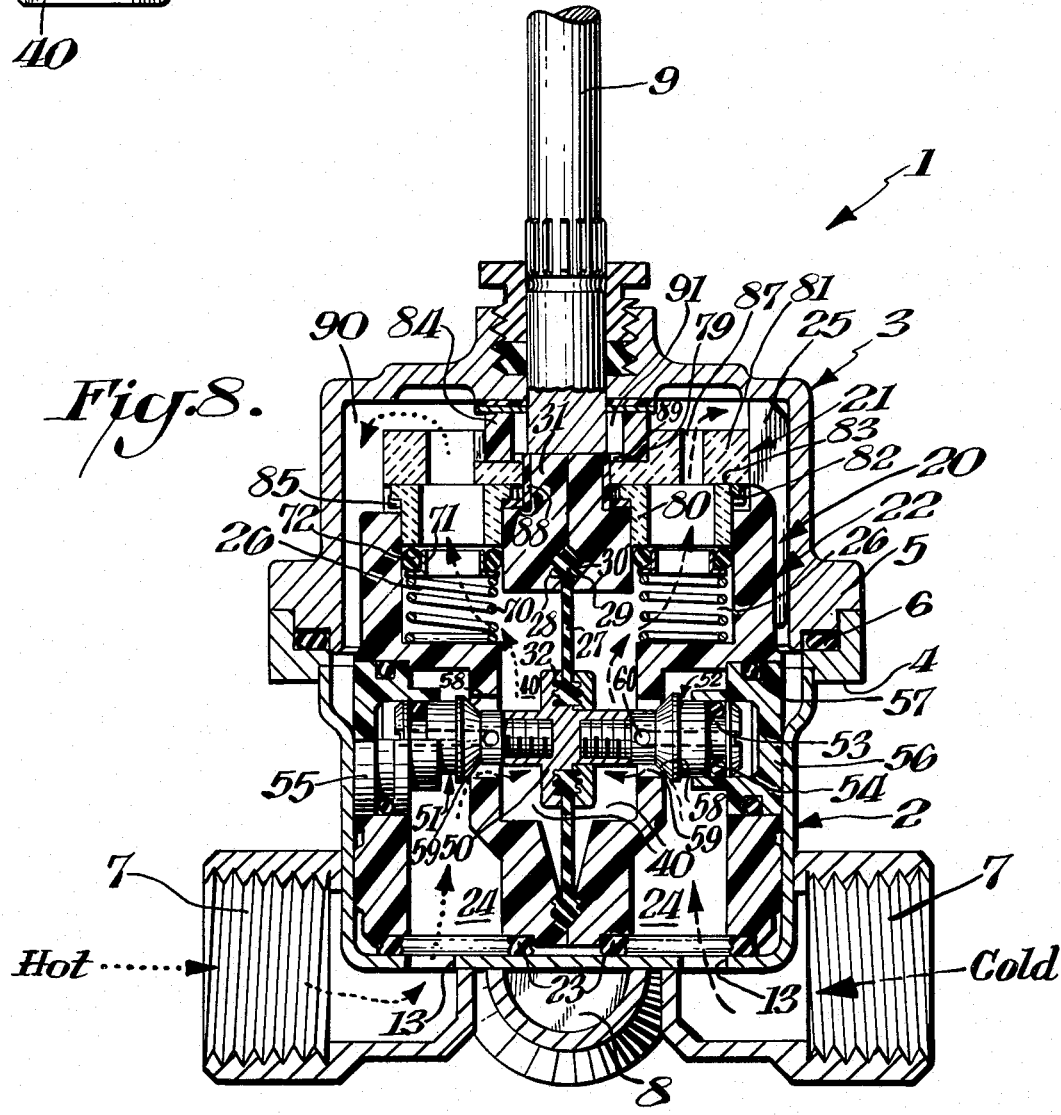
FIG. 8 is a cross sectional view along the lines 8—8 of FIG. 5 showing valve body, bonnet and cartridge in cross section.

As shown in FIGS. 1 and 8, within the mixing valve 1 there is located a valve cartridge 20 comprising a ceramic valve assembly 21 and a balanced pressure module 22. This cartridge is so designed that it may be easily dropped into the valve body 2 in mating relationship therewith and the entire valve reassembled by merely dropping the bonnet 3 back on to the valve body 2 and tightening the screws 12 in mating flanges 4 and 5. When the cartridge 20 is inserted in valve 1 according to this invention the sealing means 23 at the bottom of the cartridge surrounding the inlet openings 24 in the cartridge 20 are compressed into sealing engagement against the mating inlet openings 13 of the valve body 2 because of lugs 25 at the top of the valve cartridge 20 which engage the underside of the valve bonnet 3 in such a way that as the bonnet 3 is screwed tightly onto the valve body 2 it compresses the sealing means 23 into appropriate sealing engagement.

There are no sealing means on the side periphery of the valve cartridge 20. This avoids the problem encountered with many valve cartridges such as those shown in U.S. Pat. Nos. 3,548,875 and 3,103,231 wherein the O-rings on the periphery of the valve cartridge can lose their sealing capabilities because of distortion or breakage. Thus, a plumber or householder who finds it necessary for one reason or another to replace the valve cartridge 20 of this invention does so with the assurance that all sealing members 23 on the cartridge will properly seat and that none will be nicked, scratched, dislocated or otherwise adversely affected by the insertion of the cartridge 20 in the valve 1.

The balanced pressure module 22 comprises two mating halves which are held together with rivets or the like. Each half contains a flow path therethrough for either hot or cold water starting at the inlet opening 24 in the bottom thereof and terminating at the outlet opening 26 in the top of the module 22.

The hot and cold water paths (shown by dotted and dashed lines respectively in FIG. 8) are separated by a flexible diaphragm 27 preferably made of rubber or other flexible material which may be internally reinforced with woven fibre, steel or the like.

The balanced pressure module 22 is similar to that sold by Power Regulator Co. Model No. 410 with some important improvements therein. A specially designed bead 28 is molded into the outer periphery of the diaphragm which is captured in grooves 29 molded into the mating halves of the balanced pressure module. This groove is designed with a special internal rib 30 which is forced into the side of the diaphragm bead when the module halves are assembled. This rib 30 firmly engages the diaphragm bead preventing leakage between the hot and cold flow paths at elevated pressures. The diaphragm is also enlarged at its center with additional grooves 32 molded into this portion. This feature prevents distortion of the diaphragm in a balanced or no load positon, and therefore assures a predictable response to pressure differentials during operation.

Attached to the center of the diaphragm 27 are mating halves of a stud 50 which surround grooves 32 molded into the diaphragm. When the stud halves are brought together compressive forces created thereby are equally distributed across the peaks and valleys of grooves 32 thus avoiding any distortion to the diaphragm which is encountered in prior art devices.

The stud 50 has on its outer ends poppet valves 51, 52 for the hot and cold water flow paths, respectively. Near the outer ends of the poppet valves is a circumferential groove 53 containing O-rings or other seals 54. These O-rings seal the poppet in sliding engagement with the bore of caps 55, 56. These caps are in turn held in sealing engagement with the balanced pressure module 22 by O-rings or other sealing means 57 in a peripheral groove therein. The location of the cap sealing means in an internal groove eliminates the usual difficulties associated with placement of seals on the periphery of devices of this type, i.e. nicking, breaking or dislocation of such seals when the cartridge is placed in the valve body.

Associated with each poppet valve 51 and 52 is an integral valve portion shown in this embodiment as a conical face 58. This surface on the poppet is capable of movement in response to differential pressures across the diaphram to throttle flow between the face on a valve seat 59 which is molded or otherwise formed in the interior passages of the valve cartridge. Each poppet also contains a vent 60 or other channel formed therein which equalizes pressure across the valve poppet seals 54 and also dampens the impact of the valve poppet as it traverses back and forth within the bore of the caps 55, 56.

After passing between the poppet valve face 58 and valve seat 59 the hot or cold water flows through supply chamber 40 and out through the outlet openings 26 of the balanced pressure module. Within these openings is located a spring 70 which holds at its upper end an L-shaped sealing means support ring 71 which in turn holds an O-ring or similar sealing means 72 for preventing leakage along the bore of the outlet opening 26. The spring 70 assists in holding the ceramic valve seat 80 (described more fully below) in sealing engagement with the ceramic regulator disc 81.

The valving means used to control flow through valve 1 comprises mating ceramic valve elements 80 and 81 joined for ease of handling in the ceramic valve assembly 21 shown in FIG. 2. The mating surfaces of these elements 82, 83, respectively, are ground to a flatness equal to three helium light bands. This flatness between the mating parts assures a complete, extremely durable seal between the surfaces of elements 80 and 81 and eliminates all leakage normally associated with valves having washers, O-rings or mating surfaces of plastic.

The upper ceramic valve element called the regulator disc 81 is arranged to be rotated in relation to the fixed hot and cold water inlet valve seats 80 and is likewise made of ceramic material. The balance of the ceramic valve assembly comprises an upper stop plate 84 and a lower seat retainer 85. These two parts 84 and 85 are snap fitted together to hold the ceramic valve elements together for assembly purposes and to avoid loose parts which can get lost or misassembled. The central bore 88 in stop plate 84 is designed to rotatably fit over a post 31 on the top of balanced pressure module 22. Central bore 88 in addition has radially spaced projection 89 that are engaged by the spline end 91 of valve stem 9 to facilitate the rotation of the regulator disc 81 in relation to the fixed valve seats 80.

The ceramic valve assembly 21 and balanced pressure module 22 when joined form the valve cartridge 20 which can be quickly and easily assembled in the valve body 2 as a unit thus avoiding loose or misassembled parts which could prevent proper operation of the valve.

The ceramic regulator disc 81 is rotated by the stop plate 84 which is mounted in a groove 79 in disc 81. This stop plate has posts 86 at the end thereof which overhang the regulator disc and engage lugs 25 on the cartridge which limit rotation of the disc within the appropriate operating arc. Rotation of the stem 9 is transmitted to the regulator disc 81 through stop plate 84.

In the operation of valve 1 hot and cold water flows through inlet adpaters 7 in the valve body 2 past the respective inlet sealing means 23 in the valve cartridge and through passages 40 molded into the balanced pressure module 22. When an imbalance occurs between the pressure of the hot and cold water lines, for instance when a toilet is flushed or there is some excessive use of water upstream, the diaphragm 27 will move toward the low pressure side. Referring to FIG. 8, if the cold water is diminished, the diaphragm will move to the right. This will cause the valve face 58 on poppet valve 51 to constrict flow in the hot water line until balance is once again achieved across the diaphragm 27. In actual operation the poppets can respond quite rapidly to pressure differentials between hot and cold water lines. By so doing, the desired flow of hot and cold water—and corresponding water temperature selected by the user of the valve—flows from the valve 1.

More importantly, if for some reason cold water pressure should diminish entirely the poppet valve 51 in the hot water line (See FIG. 8) will move to the extreme right shutting off all hot water flow by the seating of the conical valve face 58 against the molded valve seat 59 in that side of the cartridge. Thus, by assuring complete stoppage of hot water flow when a loss of cold water pressure occurs, scalding of a person using the faucet is prevented. Similarly, if for some reason the hot water pressure should diminish entirely this arrangement prevents an unexpected cold shower or water flow.

The hot and cold water flows after leaving the balanced pressure area then take their respective paths through supply chamber 4 on either side of the diaphragm, through and around the biasing spring 70 and into the area of the ceramic valve assembly 21. As previously mentioned, the mating surfaces of the ceramic regulator disc 83 and valve seat 82 are polished to a flatness that achieves a perfect seal when the valve is in the off position. As can be seen more clearly in the FIGS. 2, 4 and 5 the ceramic regulator 81 disc may be generally circular in shape with two arcuate openings 87 therein. Other configurations of this disc are, of course, within the purview of this invention. When the valve is in the off position (FIG. 4) the hot and cold water valve seats 80 are in registry with that portion of the regulator disc 81 containing no openings. Upon initial clockwise movement of the valve stem the upper arcuate opening 87 in the regulator disc passes over the opening of the ceramic valve seat 80 in the cold water outlet. At this point the narrower tip of the other arcuate opening in the regulator disc 81 has not yet reached the corresponding opening of the hot water ceramic valve seat 80. Upon slight additional clockwise rotation, however, the hot water starts to flow and then mixes with the cold water to provide the desired mixed water temperature. The openings 87 in the regulator disc are so arranged that the proportion of hot and cold water flowing from the respective valve seats will combine to form varying temperatures for use by the customer. Thus if the regulator disc 81 is rotated to its full clockwise position the hot will be on maximum flow and cold will be somewhat modulated by the narrowed end of the cold water arcuate opening in the regulator disc. Any variation between these extremes of full cold or full hot can be accommodated by the particular rotational movement of the valve stem 9 and corresponding rotational movement of the regulator disc 81.

This arrangement of ceramic valve elements has distinct advantages over the usual ceramic valving arrangements such as illustrated in U.S. Pat. Nos. 3,023,769 and 3,433,264, 3,476,149 and 3,533,436, all of which depend on both lateral as well as rotational movement of mating ceramic elements to modulate flow through a mixing valve. The present arrangement using only rotation to control water temperature simplifies operation by the user of the valve and eliminates the complex "joy stick" mechanisms of these prior art devices.

Once the hot and cold water leaves the ceramic valve assembly 21 it mixes in the area 90 between the cartridge 20 and bonnet 3, and makes its way to the outlets 8 which in this embodiment is located in the bottom of the valve body. From the outlet it can be piped to one or more faucets, showers, tubs or the like.

What is claimed is:

1. A balanced pressure mixing valve comprising a lower valve body with inlet and outlet openings therein, a mating upper valve bonnet with a valve stem extending therethrough capable of rotational movement with respect to the bonnet, a modular pressure balancing cartridge having hot and cold inlet ports in the bottom of the cartridge with sealing means therein for sealing engagement with the inlet openings in said valve body, hot and cold outlet ports in the top of the cartridge with sealing means therein, the cartridge having no sealing means on the sides thereof to facilitate placement in the valve body, diaphragmatic balanced pressure means in the cartridge separating flow of hot and cold water therethrough, ceramic valve seats positioned in the outlet ports of the cartridge, a ceramic regulator disk in sealing, sliding engagement with the ceramic valve seats with openings therethrough and operable by the stem through a limited angle of rotation to bring the disk openings into and out of registry with the ceramic valve seats, said rotational movement controlling both temperature and volume of water flowing through the mixing valve.

2. The mixing valve of claim 1 wherein rotation of the stem is transmitted to the regulator disk through a stop plate which fits within a slot formed in said disk.

3. The mixing valve of claim 2 wherein said ceramic valve seats are held in place by a retainer bracket, the bracket and the stop plate being adapted for mating engagement with each other to retain the ceramic regulator disk and valve seats in a single easily replaced assembly.

4. The mixing valve of claim 1 wherein the openings in the regulator disk are elongated, tapered, arcuate slots providing a mixture of water temperatures over a wide range from full cold to full hot.

5. The mixing valve of claim 1 wherein the regulator disk is a thin flat ceramic element having two tapered arcuate openings therethrough, each of said openings having a narrow tip in one quadrant of said disk and tapering outwardly therefrom to form a widened base in the opposite quadrant of the disk.

6. In a mixing valve containing hot and cold water conduits, valve elements comprising ceramic valve seats associated with each of the conduits having substantially flat upper surfaces, a ceramic regulator disk with elongated, tapered, arcuate openings therethrough and a substantially flat lower surface for sliding, sealing engagement with the upper surfaces of the valve seats, the disk adapted for movement through a limited angle of rotation about its axis to bring the openings therein into and out of registry with said valve seats to control both temperature and volume of water flowing from the conduits.

7. The mixing valve of claim 6, wherein the regulator disk and valve seats are held in sealing, sliding engagement with each other in a readily replaceable assembly by mating engagement of a stop plate mounted on said regulator disk with a retainer bracket holding said valve seats.

8. The mixing valve of claim 6, wherein the regulator disk is a thin flat ceramic element having two tapered arcuate openings therethrough, each of said openings having a narrow tip in one quadrant of said disk and tapering outwardly therefrom to form a widened base in the opposite quadrant of the disk.

* * * * *